(No Model.)

E. J. LELAND.
PHOTOGRAPHIC PLATE HOLDER.

No. 356,072. Patented Jan. 11, 1887.

Witnesses.
W. B. Bessey
S. McDonnell

Inventor.
Edwin J. Leland
By Rufus B. Fowler
Atty.

UNITED STATES PATENT OFFICE.

EDWIN J. LELAND, OF WORCESTER, MASSACHUSETTS, ASSIGNOR OF ONE-HALF TO C. HENRY COLVIN, OF SAME PLACE.

PHOTOGRAPHIC-PLATE HOLDER.

SPECIFICATION forming part of Letters Patent No. 356,072, dated January 11, 1887.

Application filed April 6, 1886. Serial No. 197,940. (No model.)

*To all whom it may concern:*

Be it known that I, EDWIN J. LELAND, a citizen of the United States, residing at Worcester, in the county of Worcester and State of Massachusetts, have invented a new and useful Improvement in Photographic-Plate Holders, of which the following is a specification containing a full, clear, and exact description of the same, accompanied by drawings showing a holder for photographic plates embodying my invention, in which—

Figure 1:
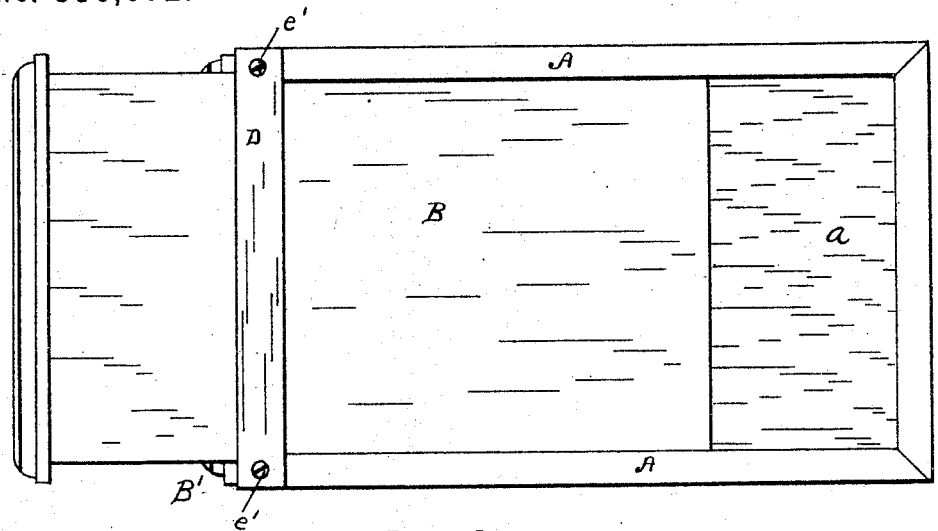
Figure 2:
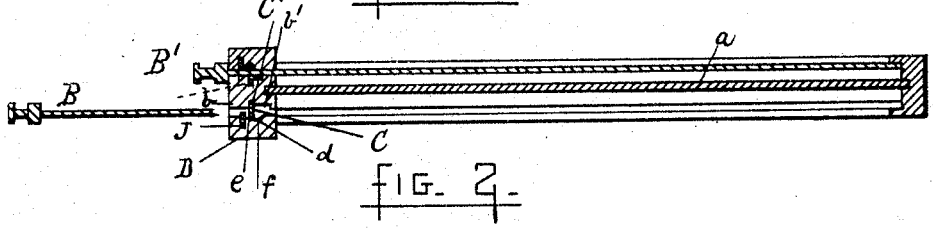
Figure 3:
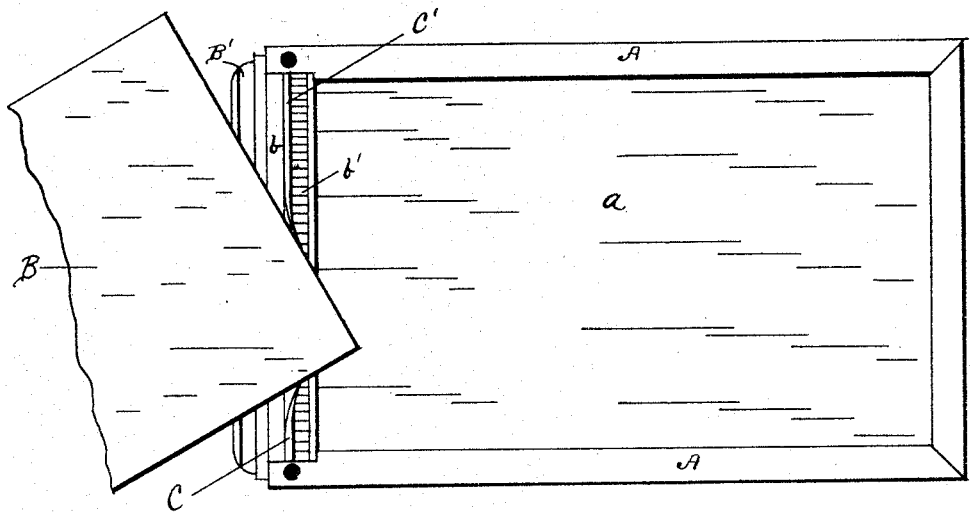

Figure 1 is an elevation of the holder with one of the slides partially removed. Fig. 2 is a sectional view of the same; and Fig. 3 is an elevation with the bar D, Fig. 1, removed and showing a portion of one of the slides with its corner entered in the plate-holder.

Similar letters refer to similar figures in the several views.

The construction and use of a plate-holder is well known and requires no detailed description, and my present invention involves no essential modification in the general construction of the plate-holders as now in use; but my invention consists in the device, as hereinafter described, for closing the aperture through which the slides pass and prevent the admission of light to the plate as the slide is withdrawn or inserted.

A A denote a rectangular frame forming the plate-holder, having a central partition, $a$, and grooves for the reception of the slides B B', which, when inserted in the frame A, inclose a space between them and the central portion, $a$, holding the sensitive or "dry" plate used in the instantaneous process of photography.

The plate-holder is inserted in the camera, bringing the sensitive plate in proper focal position behind the lens to receive the impression, and the slide B withdrawn, exposing the plate to the action of the light for a short time, when the slide B is again inserted and the plate-holder taken from the camera to the developing or "dark" room. The slide B allows a second plate to be carried in the holder, which may be reversed, bringing the slide B' to the front side.

In the use of the so-called dry-plates employed in the instantaneous process of photography the slit or opening beneath the bar D to receive the slide B must be closed to the admission of light, and to secure this result I employ an elastic strip of felt, C, attached by one edge, C', to the side $b$ of the frame A, the opposite edge, $d$, resting in its normal position against the edge of the lip $e$, formed by a groove, $f$, in the side of the bar D, which is conveniently attached by screws $e'$ to the frame A, thus completely closing the opening. Similarly attached to the bar D is a strip of felt or other elastic material, J, extending into the aperture, so as to break the direct line of light which may gain access, owing to any imperfection in the joint between the strip C, against the lip $e$. As the slides are inserted the strips C are pressed downward in the position shown in Fig. 2, the side $b$ being slightly recessed, $b'$, to admit them.

In plate-holders as heretofore used the aperture has been closed by a thin blade or leaf hinged to the side $b$ by means of a strip of rubber or other elastic material, which served to hold the blade or leaf in its normal position against the bar D, while the entrance of the slide pushed the blade downward. The blade or leaf so hinged to the holder has, however, been rigid or unyielding throughout its surface, and in case the corner of the slide was inserted as seen in Fig. 3, the blade became depressed throughout its entire length, thus opening the space between the side $b$ and bar D not occupied by the slide B. In my improved holder I attach a flexible piece, C, to the side $b$, which is yielding throughout its entire surface, whose elasticity serves to hold it in contact with the bar D, except in such portions of its length as are actually crowded down by contact with the slide B, the flexible strip C assuming the position shown in Fig. 3 whenever a corner of the slide B is inserted, the edges $d$ being held in close contact with the bar D upon both sides of the slide B. I am also aware that a layer of plush or similar material has been placed in the slit and in position to press against the slide; also, that a flexible strip of rubber has been let into a groove, so as to raise the free edge of the strip above the surface and in contact with the slide. I claim none of these, broadly.

When a single strip is used, I employ felt, as it is sufficiently elastic to resume its normal position when the slide is withdrawn, and its fibrous character prevents the slide from sticking or clinging to its surface. It also possesses the superior advantage of being compressible as well as elastic. The other features of my invention may, however, be employed with diaphragms of other elastic material.

What I claim as my invention, and desire to secure by Letters Patent, is—

1. The combination, in a photographic-plate holder provided with a slit or opening to receive a sliding shutter, of a lip formed in one of the walls of the slit and an elastic strip attached to the opposite wall of the slit, said elastic strip standing at right angles with the walls of the slit and resting against said lip, substantially as and for the purpose set forth.

2. The combination, with a photographic-plate holder having a slit to receive a slide covering the sensitive plate, of two elastic flexible diaphragms attached by one edge to opposite sides of the slit, so as to prevent the admission of light in a direct line, as and for the purpose set forth.

EDWIN J. LELAND.

Witnesses:
D. W. CARTER,
RUFUS B. FOWLER.